US012578760B2

(12) United States Patent
Horikoshi

(10) Patent No.: US 12,578,760 B2
(45) Date of Patent: Mar. 17, 2026

(54) ELECTRONIC APPARATUS

(71) Applicant: Lenovo (Singapore) Pte. Ltd.,
Singapore (SG)

(72) Inventor: Seita Horikoshi, Kanagawa (JP)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 87 days.

(21) Appl. No.: 18/744,882

(22) Filed: Jun. 17, 2024

(65) Prior Publication Data

US 2025/0036162 A1  Jan. 30, 2025

(30) Foreign Application Priority Data

Jul. 28, 2023  (JP) .................................. 2023-123536

(51) Int. Cl.
   *G06F 1/16*        (2006.01)
(52) U.S. Cl.
   CPC .................................. *G06F 1/1635* (2013.01)
(58) Field of Classification Search
   CPC .... G06F 1/1635; G06F 1/1656; G06F 1/1658;
          H05K 5/0086; H05K 5/0217; H05K 5/13
   See application file for complete search history.

(56) References Cited

U.S. PATENT DOCUMENTS

| | | | | | |
|---|---|---|---|---|---|
| 8,229,514 | B2 * | 7/2012 | Lin | ..................... | H04M 1/0258 |
| | | | | | 345/173 |
| 8,318,334 | B2 * | 11/2012 | Yang | ..................... | H01M 50/50 |
| | | | | | 429/96 |

| | | | | | |
|---|---|---|---|---|---|
| 9,277,660 | B1 * | 3/2016 | McBroom | ............ | H05K 5/0086 |
| 11,036,264 | B2 * | 6/2021 | Zhang | ................ | H05K 7/20136 |
| 2010/0026609 | A1 * | 2/2010 | Otsuki | .................. | H01M 10/48 |
| | | | | | 429/97 |

(Continued)

FOREIGN PATENT DOCUMENTS

| | | |
|---|---|---|
| JP | 2002-56830 A | 2/2002 |
| JP | 2014-116305 A | 6/2014 |

(Continued)

OTHER PUBLICATIONS

Extended European Search Report issued in corresponding European Patent Application No. 24180752.8, dated Nov. 12, 2024 (7 pages).

*Primary Examiner* — Adrian S Wilson
(74) *Attorney, Agent, or Firm* — Osha Bergman Watanabe & Burton LLP

(57)              ABSTRACT

An electronic apparatus includes: a chassis having a first chassis member which has a first edge and a second edge that are substantially parallel to each other and which is formed in a substantially rectangular plate shape, and a second chassis member to which the first chassis member is detachably connected; a battery housed in the chassis; a plurality of screws which are provided along the first edge of the first chassis member and which fasten the first edge to the second chassis member; a first engagement piece which is provided on one end portion in a longitudinal direction of the second edge of the first chassis member and which protrudes facing outward relative to the second edge; a second engagement piece which is provided on the other end portion in the longitudinal direction of the second edge of the first chassis member.

5 Claims, 10 Drawing Sheets

(56)     References Cited

U.S. PATENT DOCUMENTS

| 2014/0160655 A1* | 6/2014 | Yebka ................. | H01M 10/052 |
| | | | 361/679.08 |
| 2016/0285497 A1* | 9/2016 | Roberts ................. | G06F 1/1626 |
| 2020/0387199 A1* | 12/2020 | Kinoshita ............. | G06F 1/1616 |

FOREIGN PATENT DOCUMENTS

| JP | 2015-185787 A | 10/2015 |
| JP | 6212322 B2 | 10/2017 |
| JP | 2019-125371 A | 7/2019 |
| JP | 2020-202247 A | 12/2020 |

* cited by examiner

ELECTRONIC APPARATUS

CROSS-REFERENCE TO RELATED APPLICATIONS

This application claims priority to Japanese Patent Application No. 2023-123536 filed on Jul. 28, 2023, the contents of which are hereby incorporated herein by reference in their entirety.

TECHNICAL FIELD

The present invention relates to an electronic apparatus having a battery housed in a chassis.

BACKGROUND

An electronic apparatus such as a laptop PC, a tablet PC, or the like usually includes a chassis configured to have a flat box shape by overlapping and connecting two chassis members, and a battery housed in the chassis (refer to, for example, Japanese Patent No. 6212322).

Currently, a lithium-ion battery, which permits both reduced thinness and larger capacity, a lithium polymer battery, which permits further reduced thickness by wrapping a cell in a thin film package, or the like is used as the above-mentioned battery. Although rare, these batteries may expand in volume by 400% to 500% or more during use due to manufacturing defects or the like. A battery that has incurred such a failure has to be replaced, but there is a concern that the battery may plastically deform or cause damage such as a crack to a chassis member when expanding. This would make it necessary not only to replace the battery but also to replace the chassis, resulting in an increase in maintenance cost and effort.

SUMMARY

One or more embodiments of the present invention provide an electronic apparatus that can suppress damage to a chassis member even if a battery failure occurs.

An electronic apparatus according to an aspect of the present invention includes: a chassis having a first chassis member which has a first edge and a second edge that are substantially parallel to each other and which is formed in a substantially rectangular plate shape, and a second chassis member to which the first chassis member is detachably connected; a battery housed in the chassis; a plurality of screws which are provided along the first edge of the first chassis member and which fasten the first edge to the second chassis member; a first engagement piece which is provided on one end portion in a longitudinal direction of the second edge of the first chassis member and which protrudes outward relative to the second edge; a second engagement piece which is provided on the other end portion in the longitudinal direction of the second edge of the first chassis member and which protrudes facing outward relative to the second edge; and a first receiving part which is provided on the second chassis member and with/from which the first engagement piece engages/disengages, and a second receiving part which is provided on the second chassis member and with/from which the second engagement piece engages/disengages, wherein the battery is placed at a position closer to the second edge than to the first edge in the chassis, an end surface of the first engagement piece and an end surface of the first receiving part each has a first slope surface that gradually inclines from the first edge side toward the second edge side in a first direction extending from the one end portion to the other end portion, and an end surface of the second engagement piece and an end surface of the second receiving part each has a second slope surface that gradually inclines from the second edge side toward the first edge side in the first direction.

According to the above-described aspect of the present invention, damage to a chassis member can be suppressed even if a battery failure occurs.

DETAILED DESCRIPTION

The following will describe in detail embodiments of an electronic apparatus according to the present invention with reference to the accompanying drawings.

Figure 1:
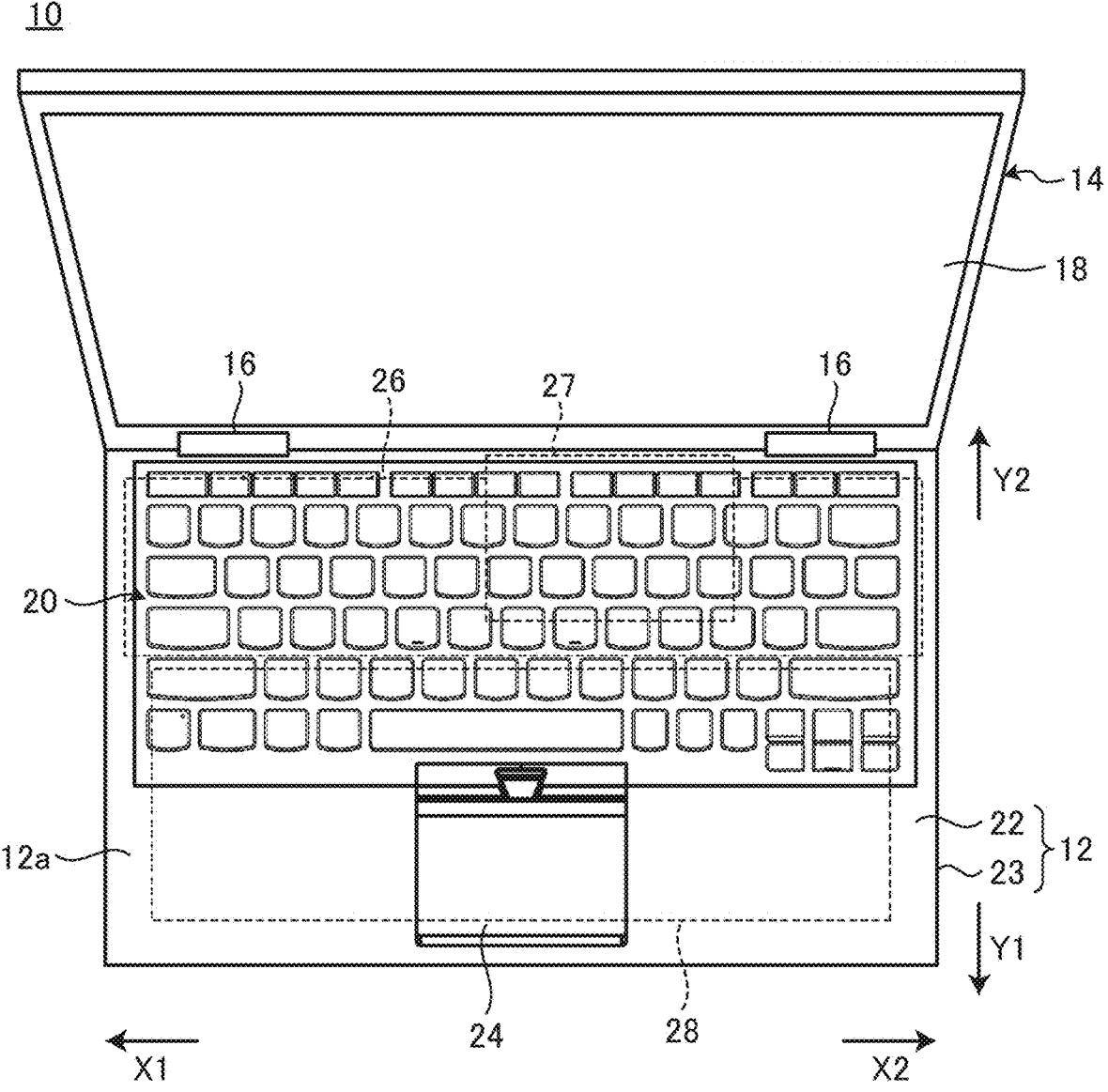
FIG. 1 is a plan view of an electronic apparatus according to one or more embodiments.

FIG. 1 is a plan view of an electronic apparatus 10 according to according to one or more embodiments. Although the electronic apparatus 10, which is a laptop PC, the electronic apparatus to which the present invention can be applied may be other than a laptop PC, such as a tablet PC, a smartphone, or a portable game machine. As illustrated in FIG. 1, the electronic apparatus 10 has a configuration in which a chassis 12 and a cover body 14 are connected to each other by hinges 16 so as to be relatively rotatable. FIG. 1 illustrates a state in which the cover body 14 is opened from the chassis 12 (ready mode).

The cover body 14 is formed like a flat box. A display 18 is mounted on the front of the cover body 14. The display 18 is, for example, an organic EL display or a liquid crystal display. The cover body 14 is connected to the rear edge of the chassis 12 by the hinges 16. FIG. 1 illustrates a configuration in which the cover body 14 is connected to the chassis 12 by a pair of left and right hinges 16. The hinges 16 may have a lengthy configuration extending in an X direction, such as a so-called one-bar hinge.

Hereinafter, the chassis 12 will be described by referring the left and right width directions as X1 and X2 directions, the front and rear depth directions as Y1 and Y2 directions, and the up and down thickness directions as Z1 and Z2 directions as seen from a user who operates a keyboard 20 while looking at the display 18 in the ready mode illustrated in FIG. 1. The X1 and X2 directions may be collectively referred to as the X direction, and the Y1 and Y2 directions and the Z1 and Z2 directions may also be similarly referred to as the Y direction and Z direction, respectively.

The chassis 12 has a structure in which a first chassis member 22 and a second chassis member 23 are connected. The chassis 12 is shaped like a flat box. The keyboard 20 is fixed to the second chassis member 23, facing a front surface 12*a* of the chassis 12. On the front surface 12*a* of the chassis 12, a touch pad 24 is provided in front of the keyboard 20. Housed inside the chassis 12 are electronic components such as a motherboard 26 having a CPU, memories, and the like mounted thereon, and a cooling module 27 for cooling the CPU and the like.

Further, a battery 28 serving as a power source of the electronic apparatus 10 is also housed inside the chassis 12. The battery 28 is, for example, a lithium-ion battery or a lithium polymer battery. In one or more embodiments, a lithium polymer battery is used. The battery 28 has, for example, a substantially rectangular plate shape, as a whole, that is long in the X direction and short in the Y direction. Inside the chassis 12, the battery 28 is placed at a position closer to the Y1 side from the center in the Y direction. Therefore, the battery 28 extends in the X direction at a position close to an edge 22*d* and a vertical wall 23*d* of the chassis 12. The motherboard 26 is placed alongside the battery 28 on the Y2 side and extends in the X direction.

A description will now be given of a specific configuration example of the chassis 12.

Figure 2:
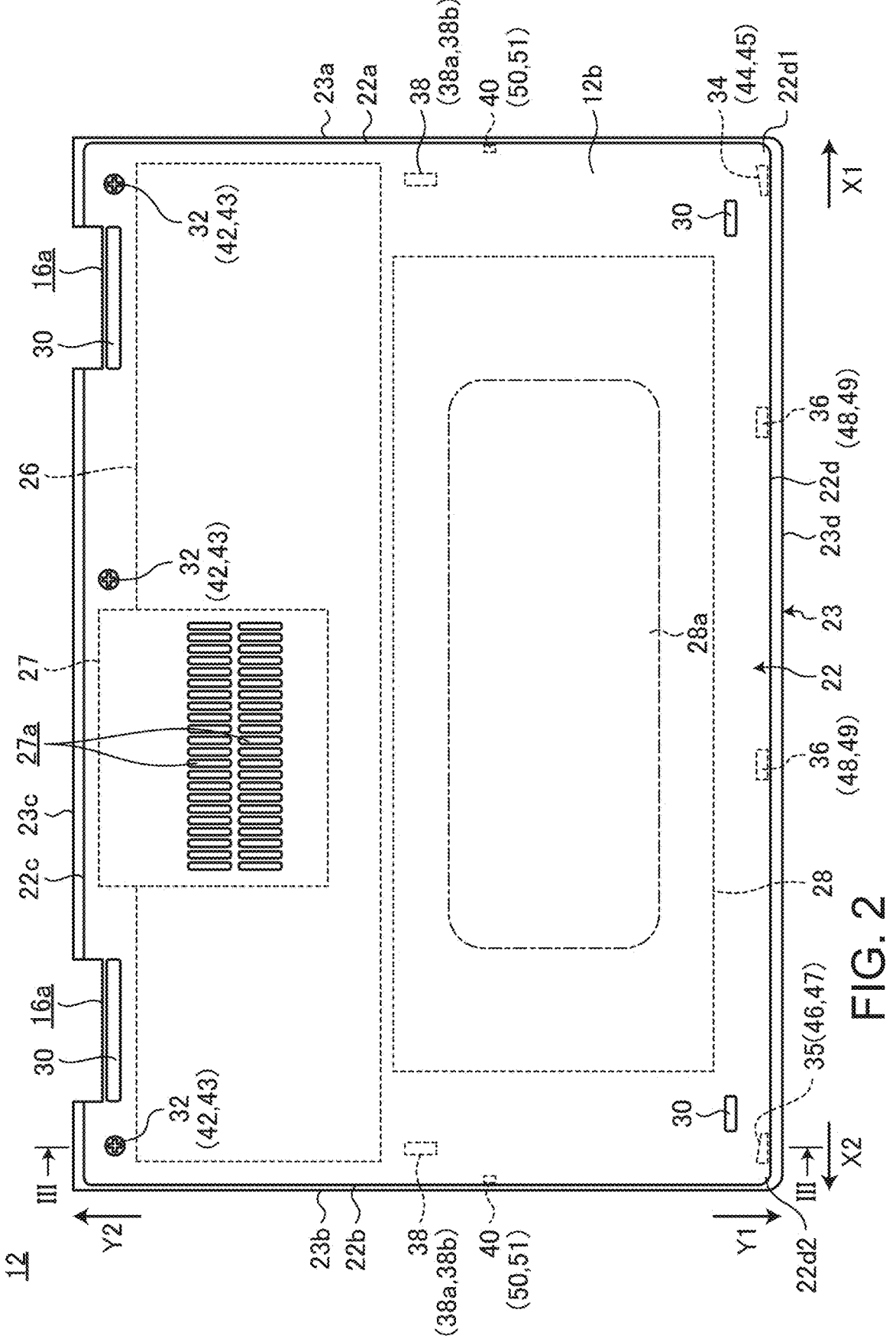
FIG. 2 is a bottom view of a chassis.
Figure 3A:
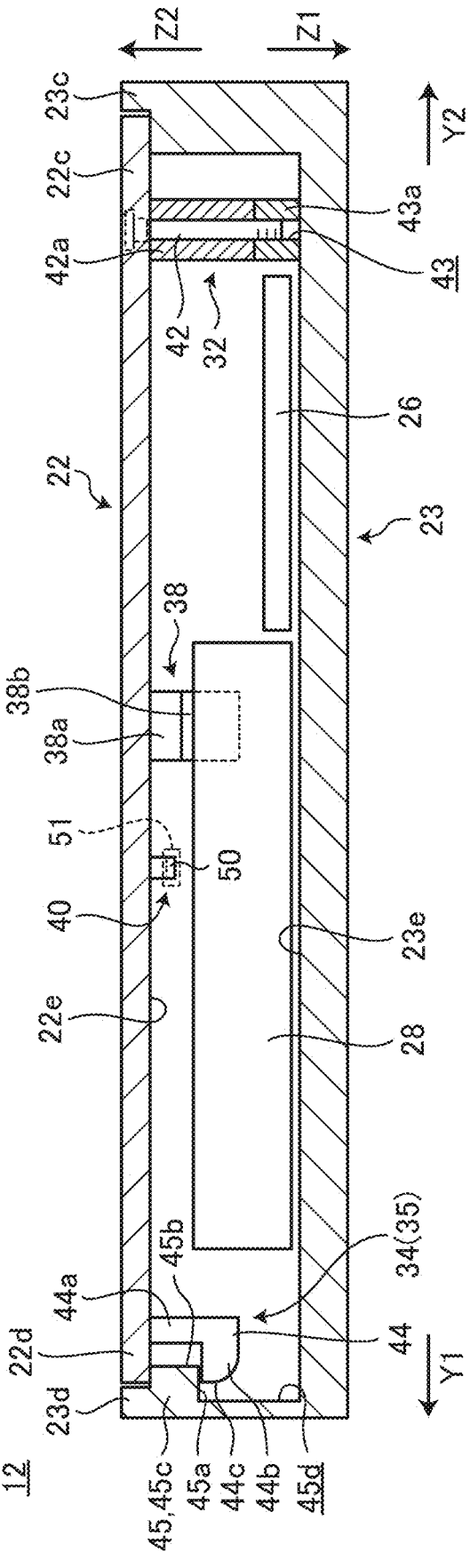
FIG. 3A is a schematic sectional view taken along line III-III in FIG. 2.
Figure 3B:
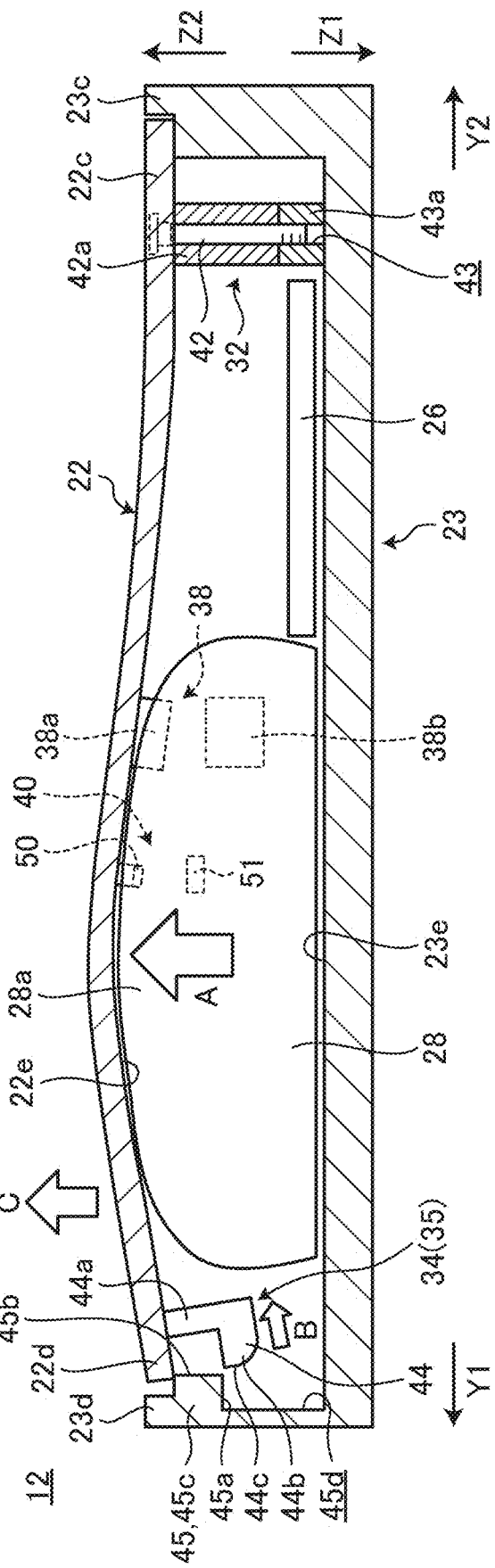
FIG. 3B is a sectional view illustrating a state in which a battery illustrated in FIG. 3A has expanded.

FIG. 2 is a bottom view of the chassis 12. FIG. 3A is a schematic sectional view taken along line III-III in FIG. 2. FIG. 3B is a sectional view illustrating a state in which the battery 28 illustrated in FIG. 3A has expanded. As illustrated in FIG. 1 to FIG. 3A, the first chassis member 22 is formed like a substantially rectangular plate. The second chassis member 23 is shaped like a substantially rectangular bathtub. The chassis members 22 and 23 can be formed of a metal material such as magnesium or aluminum, a resin material such as ABS resin or glass fiber reinforced plastic, or a carbon material such as carbon fiber reinforced plastic.

The first chassis member 22 forms a bottom face 12*b* of the chassis 12. The first chassis member 22 has a pair of edges 22*a* and 22*b*, which extend along the Y direction and are substantially parallel to each other, and a pair of edges 22*c* and 22*d*, which extend along the X direction and are substantially parallel to each other. The second chassis member 23 has, on four peripheral edges thereof, vertical walls 23*a* to 23*d* that form four peripheral side faces of the chassis 12, and is open at the bottom face 12*b*. The vertical walls 23*a* to 23*d* are in close contact with the edges 22*a* to 22*d*, respectively. The first chassis member 22 serves as a cover member that closes the opening at the bottom face 12*b* of the second chassis member 23. The vertical wall 23*c* forming the side surface of the chassis 12 on the Y2 side has recessed portions 16*a* in the vicinity of left and right ends. The recessed portions 16*a* are the spaces where the hinges 16 are installed.

A concept of the edges 22*a*, 22*b* and the edges 22*c*, 22*d* being roughly parallel to each other includes not only the case where the edges 22*a* to 22*d* are formed by perfectly straight lines and are perfectly parallel to each other, but also the case where the edges 22*a* to 22*d* have some curves or irregularities and are not perfectly parallel to each other. Therefore, the outer shape of the first chassis member 22 having the four peripheral sides formed by such edges 22*a* to 22*d* is also referred to as a substantially rectangular shape on the basis of the concept that includes a perfect square and a slightly distorted square.

Symbol 30 in FIG. 2 denotes rubber legs fixed at appropriate positions on the bottom face 12*b*. Symbol 27*a* in FIG. 2 denotes intake ports for a cooling module 27, the intake ports 27*a* being formed of, for example, a plurality of slits opened in the bottom face 12*b*.

As illustrated in FIG. 2, the first chassis member 22 is detachably connected to the second chassis member 23 by using fastening parts 32, a first engagement part 34, a second engagement part 35, third engagement parts 36, attraction parts 38, and auxiliary engagement parts 40.

As illustrated in FIG. 2 and FIG. 3A, each of the fastening parts 32 is composed of a screw 42 and a screw hole 43 into which the screw 42 is screwed. The fastening parts 32 are provided at, for example, three locations along the longitudinal direction (the X direction) of the edge 22*c* of the first chassis member 22. The fastening parts 32 fasten one end portion (on the X1 side) in the longitudinal direction of the edge 22*c*, the other end portion (on the X2 side) thereof, and a middle portion between these both end portions to the second chassis member 23. The placement and the number of the fastening parts 32 to be installed can be changed as appropriate.

Each of the screws 42 is, for example, inserted in a Z1 direction into a boss 42*a*, which protrudes in the Z1 direction from an inner surface 22*e* of the first chassis member 22. Each of the screw holes 43 is formed, for example, in the inner circumferential surface of a boss 43*a* protruding in a Z2 direction from an inner surface 23*e* of the second chassis member 23. This enables the fastening parts 32 to firmly fix the edge 22*c* of the first chassis member 22 to the second chassis member 23.

As illustrated in FIG. 2 and FIG. 3A, the first engagement part 34 is composed of an engagement piece (a first engagement piece) 44 and a receiving part (a first receiving part) 45. The first engagement part 34 is a hook-shaped latch engagement part that connects the edge 22*d* of the first chassis member 22 to the second chassis member 23. The first engagement part 34 is provided on the inner surface 22*e* of an end portion 22*d*1 at one end (on the X1 side) in the longitudinal direction of the edge 22*d*. In other words, the first engagement part 34 is positioned in the vicinity of the corner between the end portion on the X1 side and the end portion on the Y1 side of the first chassis member 22.

Figure 4:
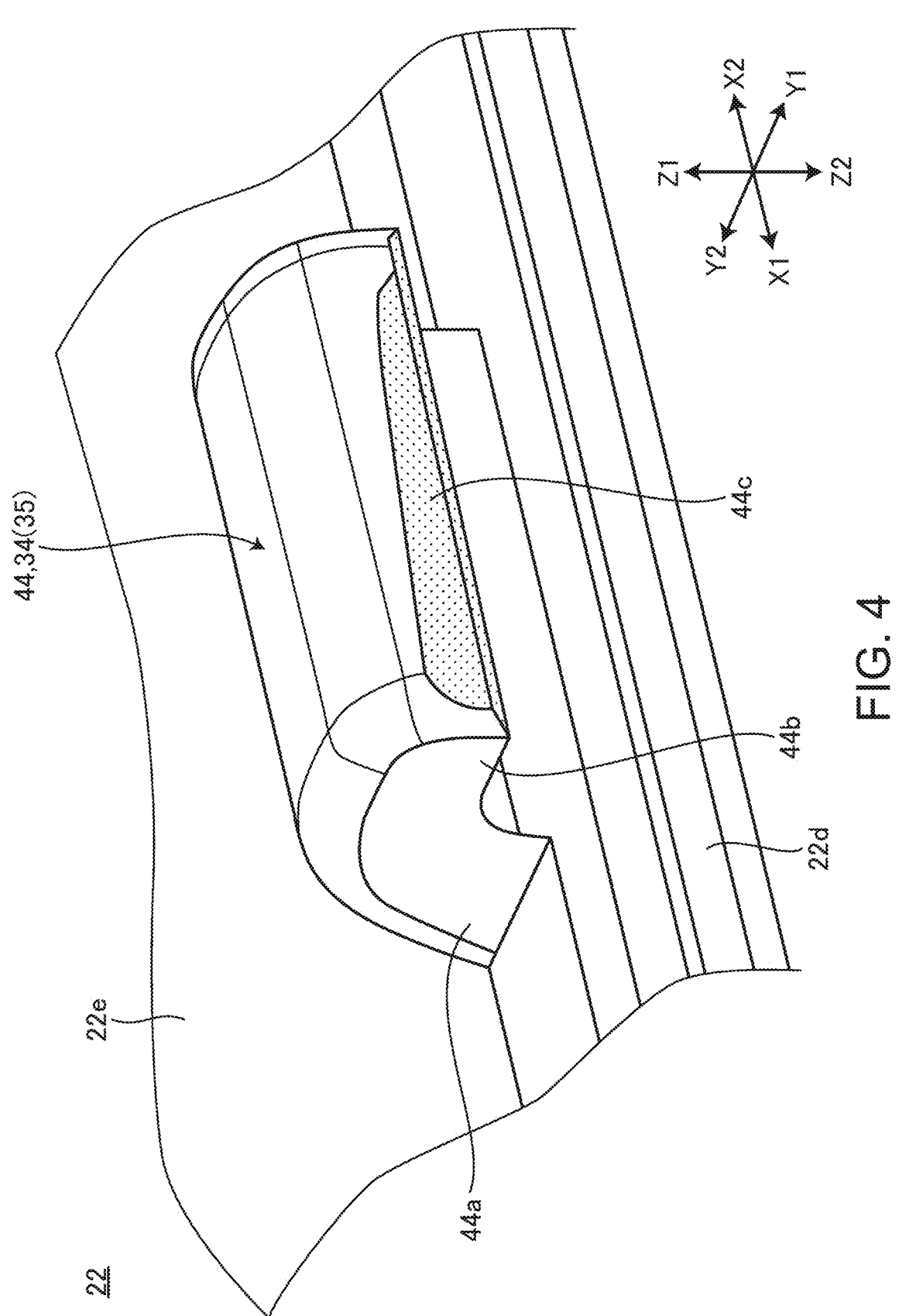
FIG. 4 is an enlarged perspective view of an engagement piece and a peripheral area thereof.
Figure 5:
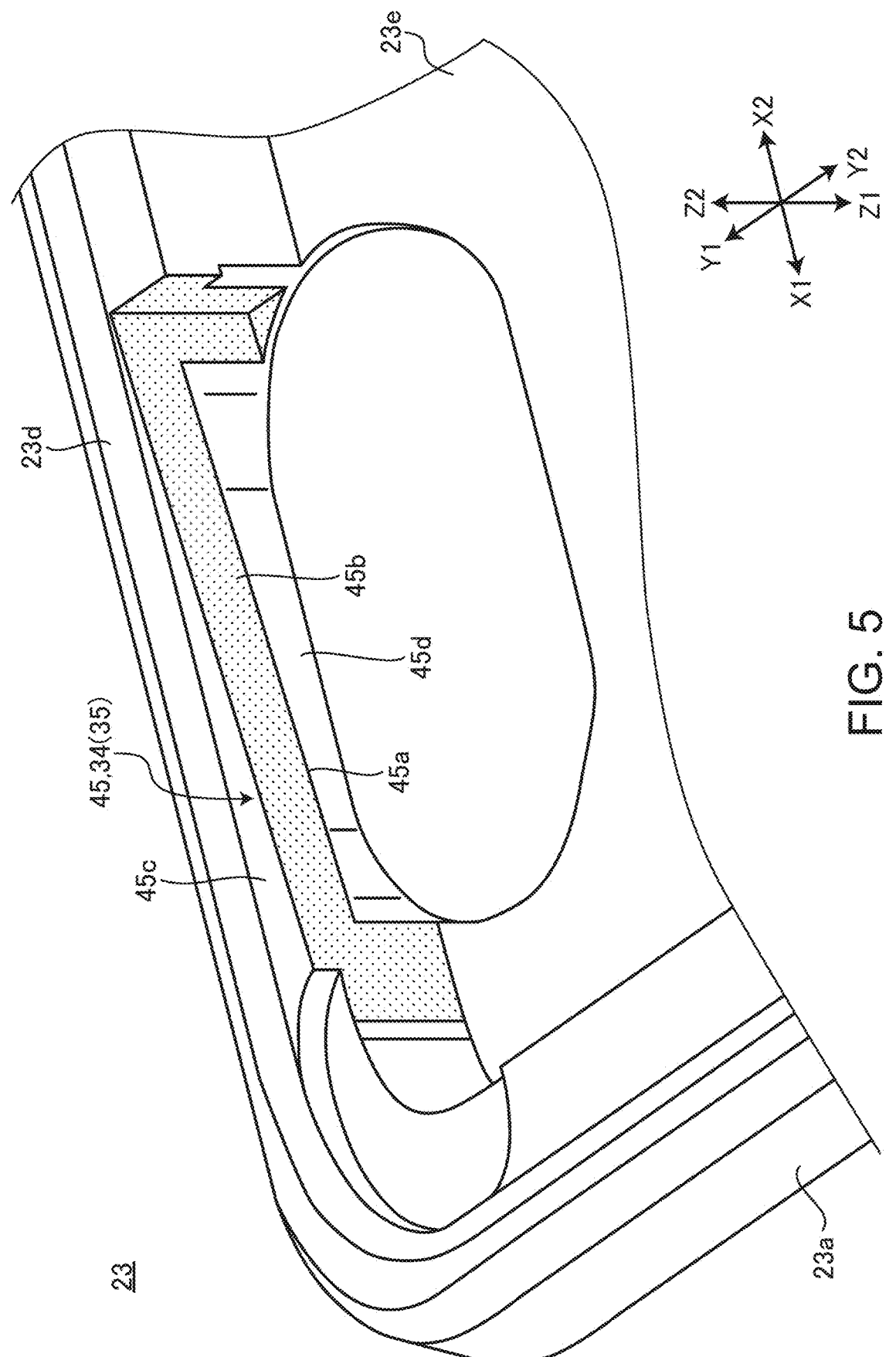
FIG. 5 is an enlarged perspective view of a receiving part and a peripheral area thereof.
Figure 6A:
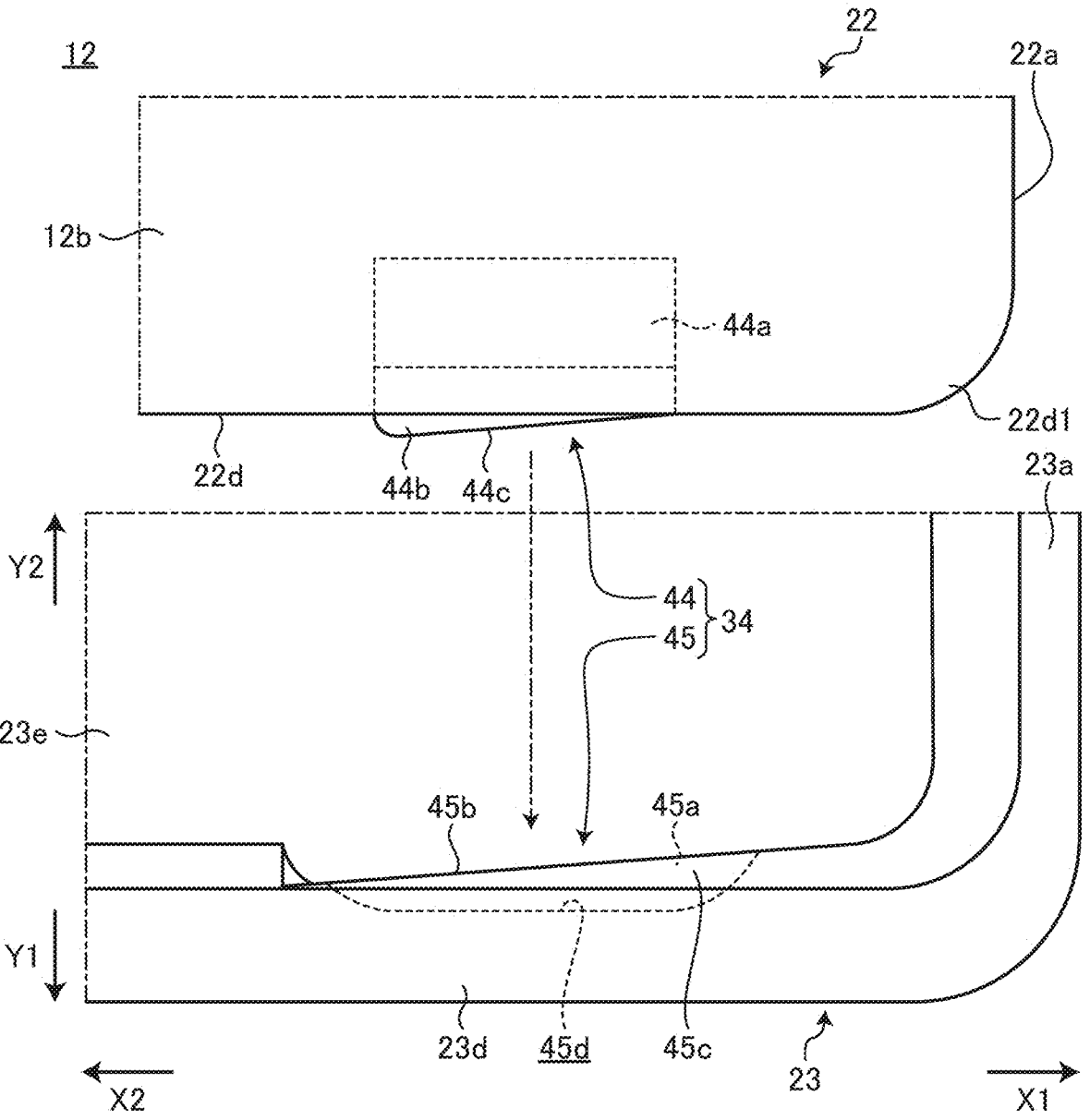
FIG. 6A is a bottom view schematically illustrating a state immediately before an engagement piece is engaged with a receiving part.
Figure 6B:
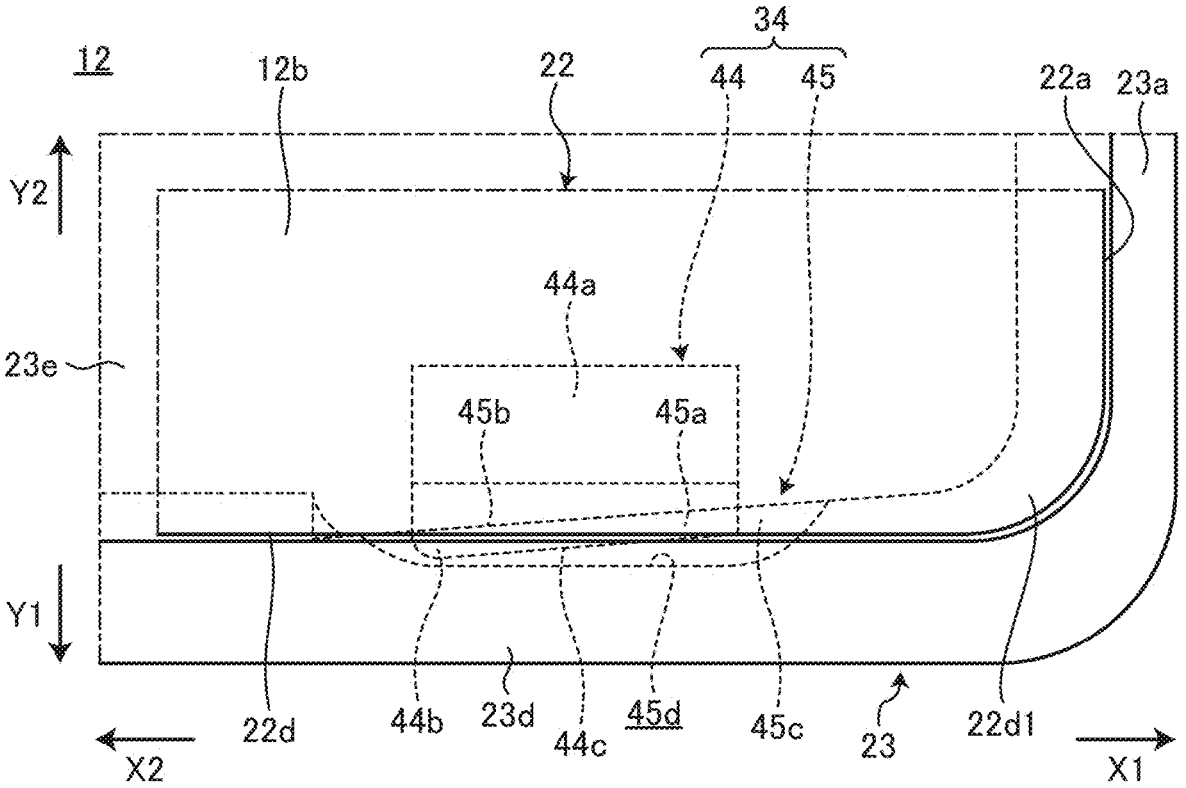
FIG. 6B is a bottom view illustrating a state in which the engagement piece illustrated in FIG. 6A has been engaged with the receiving part.
Figure 7:
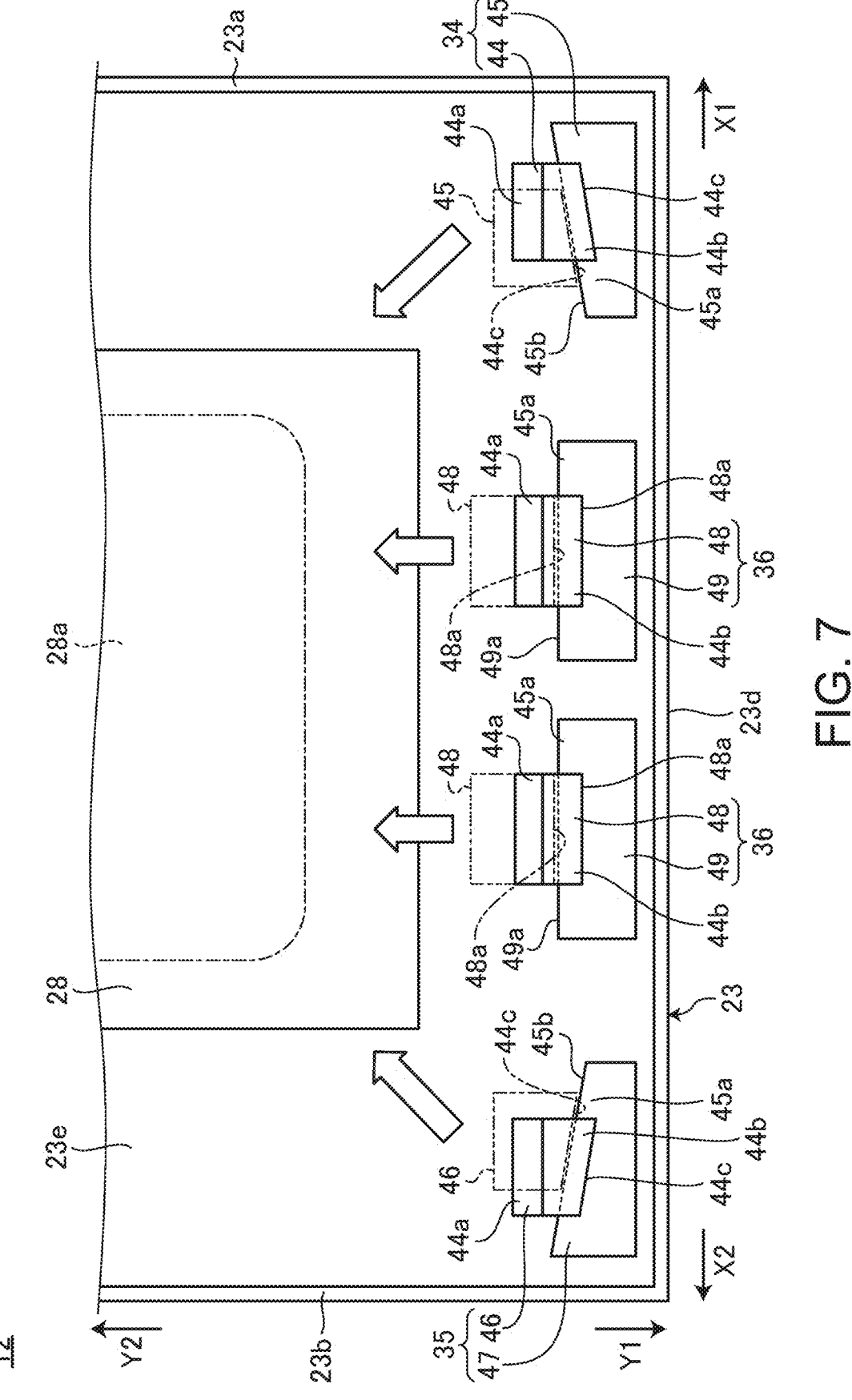
FIG. 7 is an explanatory diagram schematically illustrating a first to a third engagement parts that have been engaged.

FIG. 4 is an enlarged perspective view of the engagement piece 44 and a peripheral area thereof. FIG. 5 is an enlarged perspective view of the receiving part 45 and a peripheral area thereof. FIG. 6A is a bottom view schematically illustrating a state immediately before the engagement piece 44 is engaged with the receiving part 45. FIG. 6B is a bottom view illustrating a state in which the engagement piece 44 illustrated in FIG. 6A has been engaged with the receiving part 45. FIG. 7 is an explanatory diagram schematically illustrating the first to the third engagement parts 34 to 36 that have been engaged. FIG. 7 is a schematic diagram of the chassis 12 observed from the bottom face 12*b*, with the first chassis member 22 other than the engagement pieces 44, 46, and 48 not being illustrated.

As illustrated in FIG. 4, FIG. 6A, and FIG. 7, the engagement piece 44 is a hook-shaped part which is provided on the inner surface 22*e* of the end portion 22*d*1 at the one end (on the X1 side) of the edge 22*d* and protrudes facing outward (on the Y1 side) relative to the edge 22*d*. The engagement piece 44 has a protruding piece 44*a*, a hook portion 44*b*, and a slope surface 44*c*.

The protruding piece 44*a* is a plate piece protruding in the Z1 direction from the inner surface 22*e* of the first chassis member 22. The hook portion 44*b* bends from the tip of the protruding piece 44*a* and protrudes in the Y1 direction.

As clearly illustrated by the dot pattern in FIG. 4, the slope surface 44*c* has a configuration in which the tip surface (the end surface on the Y1 side) of the hook portion 44*b* is partly cut. The slope surface 44*c* is a vertical surface along the Z direction, and also gradually inclines in the X2 direction from the Y2 side to the Y1 side. This means that, in a plan view of the chassis 12, the slope surface 44*c* gradually inclines from the edge 22*c* side toward the edge 22*d* in the X2 direction (the first direction) extending from the end portion 22*d*1 at the one end of the edge 22*d* to an end portion 22*d*2 at the other end thereof. The hook portion 44*b* has such a slope surface 44*c* at the tip thereof. This makes it easy for the engagement piece 44 to be released from the engagement with the receiving part 45 when horizontally moving in the diagonal direction (X2/Y2 direction) between the X2 direction and the Y2 direction.

As illustrated in FIG. 5, FIG. 6A, and FIG. 7, the receiving part 45 is a part which is formed on the inner wall surface of the vertical wall 23*d* of the second chassis member 23 corresponding to the edge 22*d*, and with/from which the hook-shaped engagement piece 44 engages/disengages. The receiving part 45 has a receiving surface 45*a* and a slope surface 45*b*.

The vertical wall 23*d* has a plate piece 45*c* formed to protrude in the Y2 direction from the inner wall surface. The receiving surface 45*a* is the front surface of the plate piece 45*c* on the Z1 side. The receiving surface 45*a* functions as a locking surface that locks, in the Z direction, the surface of the hook portion 44*b* of the engagement piece 44 on the Z2 side. The receiving part 45 in one or more embodiments has a recessed portion 45*d* formed in the inner wall surface of the vertical wall 23*d* so as to be recessed on the Y1 side, thereby causing the plate piece 45*c* and the receiving surface 45*a* to protrude from the inner wall surface. The receiving part 45 may alternatively be formed to have the plate piece 45*c* protrude from the inner wall surface of the vertical wall 23*d* without providing the recessed portion 45*d*.

As clearly illustrated by the dot pattern in FIG. 5, the slope surface 45*b* has a configuration in which the tip surface (the end surface on the Y2 side) of the receiving part 45 (the plate piece 45*c*) is partly cut. The slope surface 45*b* is a vertical surface along the Z direction, and also gradually inclines in the X2 direction from the Y2 side to the Y1 side. This means that, when the direction of each part of the first chassis member 22 is used as the reference in the plan view of the chassis 12, the slope surface 45*b* gradually inclines from the edge 22*c* to the edge 22*d* in the X2 direction (the first direction) extending from the end portion 22*d*1 at the one end of the edge 22*d* to the end portion 22*d*2 at the other end thereof. The receiving part 45 has such a slope surface 45*b* at the tip thereof. This makes it easy for the receiving surface 45*a* to be easily released from the engagement with the hook portion 44*b* when the engagement piece 44 horizontally moves in the X2/Y2 direction.

As illustrated in FIG. 2 and FIG. 3A, the second engagement part 35 is composed of the engagement piece (the second engagement piece) 46 and a receiving part (a second receiving part) 47. The second engagement part 35 is a hook-shaped latch engagement part that connects the edge

22*d* of the first chassis member 22 to the second chassis member 23. The second engagement part 35 is provided on the inner surface 22*e* of the end portion 22*d*2 at the other end (on the X2 side) in the longitudinal direction of the edge 22*d*. In other words, the second engagement part 35 is positioned in the vicinity of the corner between the end portion on the X2 side and the end portion on the Y1 side of the first chassis member 22.

The second engagement part 35 of one or more embodiments has a symmetrical shape with respect to a surface (YZ plane) orthogonal to the longitudinal direction of the edge 22*d* (refer to FIG. 2 and FIG. 7). Therefore, for each component of the engagement piece 46 and the receiving part 47, the same symbols as those of the components of the engagement piece 44 and the receiving part 45 that constitute the first engagement part 34 described above will be used, and the detailed descriptions thereof will be omitted.

The engagement piece 46 also has the protruding piece 44*a*, the hook portion 44*b*, and the slope surface 44*c*. The slope surface 44*c* of the engagement piece 46 is a vertical surface along the Z direction, and gradually inclines from the Y2 side to the Y1 side in the X1 direction. In other words, in the plan view of the chassis 12, the slope surface 44*c* of the engagement piece 46 gradually inclines from the edge 22*d* side to the edge 22*c* side in the X2 direction (the first direction) extending from the end portion 22*d*1 at the one end of the edge 22*d* to the end portion 22*d*2 at the other end thereof. Similarly, the receiving part 47 has the receiving surface 45*a* and the slope surface 45*b*. The slope surface 45*b* of the receiving part 47 is a vertical surface along the Z direction, and gradually inclines from the Y2 side to the Y1 side in the X1 direction. More specifically, when the direction of each part of the first chassis member 22 is used as the reference in the plan view of the chassis 12, the slope surface 45*b* of the receiving part 47 gradually inclines from the edge 22*d* side to the edge 22*c* side in the X2 direction (the first direction) extending from the end portion 22*d*1 at the one end of the edge 22*d* to the end portion 22*d*2 at the other end thereof.

Thus, the second engagement part 35 also has the slope surfaces 44*c* and 45*b* at the tips of the engagement piece 46 and the receiving part 47. This makes it easy for the second engagement part 35 to be easily released from the engagement with the receiving part 47 when the engagement piece 46 horizontally moves in the diagonal direction (X1/Y2 direction) between the X1 direction and the Y2 direction in a plan view.

As illustrated in FIG. 2 and FIG. 3A, the third engagement part 36 is composed of the engagement piece (the third engagement piece) 48 and a receiving part (a third receiving part) 49. The third engagement part 36 is a hook-shaped latch engagement part that connects the edge 22*d* of the first chassis member 22 to the second chassis member 23. The third engagement part 36 is provided on the inner surface 22*e* between the end portions 22*d*1 and 22*d*2 in the longitudinal direction of the edge 22*d*. The third engagement part 36 in one or more embodiments is provided in a pair side by side along the edge 22*d*. One or three or more third engagement parts 36 may be provided.

The engagement piece 48 has a configuration in which the engagement piece 44 illustrated in FIG. 4 is not provided with the slope surface 44*c*. More specifically, the engagement piece 48 has a protruding piece 44*a* and a hook portion 44*b* similar to those of the engagement piece 44. However, the hook portion 44*b* of the engagement piece 48 does not have the tip surface thereof cut. Therefore, the end surface of the engagement piece 48 on the Y1 side is provided with a plane 48*a* which is a vertical surface along the Z direction and which extends along the longitudinal direction (the X direction) of the edge 22*d* (refer to FIG. 7).

The receiving part 49 has a configuration in which the receiving part 45 illustrated in FIG. 5 is not provided with the slope surface 45*b*. More specifically, the receiving part 49 has the receiving surface 45*a* and the plate piece 45*c* similar to those of the receiving part 45. However, the plate piece 45*c* of the receiving part 49 does not have the tip surface thereof cut. Therefore, the end surface of the receiving part 49 on the Y2 side is provided with a plane 49*a* which is a vertical surface along the Z direction and which extends along the longitudinal direction (the X direction) of the edge 22*d* and the vertical wall 23*d* (refer to FIG. 7).

As illustrated in FIG. 2 and FIG. 3A, each of the attraction parts 38 is composed of a first attraction piece 38*a* and a second attraction piece 38*b*, which can attract each other. The attraction parts 38 fix the left and right edges 22*a* and 22*b* of the first chassis member 22 to the second chassis member 23 by magnetic force. One of the attraction pieces 38*a* and 38*b* can be composed of a magnet, and the other can be composed of a magnet or a magnetic material, such as steel, capable of being attracted by the magnet. The attraction pieces 38*a* and 38*b* of one or more embodiments are both magnets.

The first attraction pieces 38*a* are fixed to the inner surface 22*e* at the middle in the longitudinal direction (the Y direction) of the left and right edges 22*a* and 22*b* of the first chassis member 22. The second attraction pieces 38*b* are fixed to the inner surface 23*e* of the second chassis member 23 at positions overlapping the first attraction pieces 38*a* in the Z direction. The attraction parts 38 are thus provided at the middles of the edges 22*a* and 22*b*, where the fastening parts 32 and the engagement parts 34 to 36 are not provided, i.e., in the vicinity of the centers in the Y direction, to suppress the occurrence of rattling and a gap between chassis members 22 and 23. If, for example, the first chassis member 22 has sufficient rigidity, the attraction parts 38 may be omitted.

As illustrated in FIG. 2 and FIG. 3A, each of the auxiliary engagement parts 40 is composed of an elastic engagement piece 50 and a receiving part 51. The auxiliary engagement parts 40 are hook-shaped latch engagement parts that connect the left and right edges 22*a* and 22*b* of the first chassis member 22 to the second chassis member 23. The auxiliary engagement parts 40 are provided on the inner surface 22*e* at the middles in the longitudinal direction (the Y direction) of the edges 22*a* and 22*b*, and are located adjacently to the attraction parts 38.

The elastic engagement pieces 50 have hook portions that protrude facing outward relative to the edges 22*a* and 22*b* from the tips of the protruding pieces projecting in the Z1 direction from the inner surface 22*e*. The elastic engagement piece 50 of the edge 22*a* has the hook portion protruding in the X1 direction. The elastic engagement piece 50 of the edge 22*b* has the hook portion protruding in the X2 direction. The receiving parts 51 are parts which are formed on the inner wall surfaces of the vertical walls 23*a* and 23*b* of the second chassis member 23 corresponding to the edges 22*a* and 22*b*, and with/from which the hook portions of the elastic engagement pieces 50 engage/disengage. The elastic engagement pieces 50 are hook-shaped parts that are considerably smaller than the engagement pieces 44, 46, and 48 described above. The protruding pieces of the elastic engagement pieces 50 can be elastically deformed in the X direction. This enables the elastic engagement pieces 50 to be easily engaged with or disengaged from the receiving parts 51 along the Z direction.

As with the attraction parts 38, the auxiliary engagement parts 40 are provided at the middles of the edges 22*a* and 22*b* to suppress the occurrence of rattling and a gap between the chassis members 22 and 23. If, for example, the first chassis member 22 has sufficient rigidity, the auxiliary engagement parts 40 may be omitted.

Meanwhile, in the electronic apparatus 10 of one or more embodiments, the battery 28 composed of, for example, a lithium polymer battery, may, although rare, develop a so-called swell phenomenon in which the volume thereof expands by 400% to 500% or more during use due to manufacturing defects or the like (refer to FIG. 3B). FIG. 2 and FIG. 7 schematically illustrate an expansion part 28*a* of the battery 28 by surrounding with the chain line. The battery 28 having incurred such failure has to be replaced. However, the battery 28, when expanding, presses the first chassis member 22 from the inside, leading to damage to the first chassis member 22. Therefore, the electronic apparatus 10 is provided with the above-described engagement parts 34 and 35, in particular, thus making it possible to suppress damage to the first chassis member 22 when the battery 28 expands, and to smoothly remove the battery 28 from the second chassis member 23 to replace the battery 28.

A description will now be given of the operation and working effect of the chassis 12 when the battery 28 expands.

As illustrated in FIG. 2 and FIG. 3A, in the chassis 12, when the chassis members 22 and 23 are in connection, the screws 42 are tightened into the screw holes 43 in the fastening parts 32, the attraction pieces 38*a* and 38*b* are fixed by attraction in the attraction parts 38, and the elastic engagement pieces 50 engage the receiving parts 51 in the auxiliary engagement parts 40. Further, as illustrated by the engagement pieces 44, 46, and 48 drawn in FIG. 2, FIG. 3A, FIG. 6B, and FIG. 7, the engagement pieces 44, 46, and 48 of the engagement parts 34 to 36 engage the receiving parts 45, 47, and 49, respectively. As a result, the first chassis member 22 is firmly connected to the second chassis member 23 without rattling.

In this state, if the battery 28 expands due to a failure or the like, the expansion part 28*a* pushes the inner surface 22*e* of the first chassis member 22 upward in the Z2 direction, as illustrated in FIG. 3B (refer to arrow A in FIG. 3B). The battery 28 is positioned closer to the Y1 side in the chassis 12 (refer also to FIG. 2). Therefore, the expansion part 28*a* pushes the inner surface 22*e* at a position in the vicinity of the center of the first chassis member 22 in the X direction and closer to the edge 22*d* on the Y1 side rather than the edge 22*c* on the Y2 side. This causes the first chassis member 22 to be elastically deformed to expand into a dome shape or a tent shape, with a portion thereof overlapping the expansion part 28*a* in the Z direction so as to become a roof top, as indicated by the four arrows in FIG. 7. As a result, in the first chassis member 22, the edge 22*c* moves in the Y2 direction, the end portion 22*d*1 and the surroundings thereof move in the X2 direction, and the end portion 22*d*2 and the surroundings thereof also move to the X1 side.

Consequently, in the first engagement part 34 in the vicinity of the end portion 22*d*1, the engagement piece 44 moves in the diagonal direction (X2/Y2 direction). In the second engagement part 35 in the vicinity of the end portion 22*d*2, the engagement piece 46 moves in the diagonal direction (the X1/Y2 direction). On the other hand, in the third engagement parts 36 located between the end portions 22*d*1 and 22*d*2, the engagement pieces 48 move substantially in the linear direction (the Y2 direction).

Further, when, for example, the expansion rate of the battery 28 exceeds a set value, e.g., 100% to 150%, the engagement state at each of the engagement parts 34 to 36 is released as illustrated by the engagement pieces 44, 46, and 48 drawn in FIG. 3B and FIG. 7. In other words, the engagement between the engagement pieces 44, 46, and 48 and the receiving parts 45, 47, and 49 is released, thus releasing the edge 22*d* (refer to arrow B in FIG. 3B). As a result, in the first chassis member 22, the edge 22*d* is separated from the second chassis member 23 and lifted to the Z2 side (refer to arrow C in FIG. 3B). At that time, the fixation of the attraction pieces 38*a* and 38*b*, which have been fixed merely by magnetic force, is also released. Further, in the auxiliary engagement part 40, the elastic engagement piece 50 is drawn by the expansion part 28*a* toward the center of the first chassis member 22 in the X direction thereby to be released from the engagement with the receiving part 51.

Meanwhile, the fastening parts 32 are fixed by the screws 42, so that the edge 22*c* still remains connected to the second chassis member 23. As a result, the first chassis member 22 is in an open state in which the edge 22*d* in the vicinity of the battery 28 and a part of the left and right edges 22*a*, 22*b* on the Y1 side is detached from the second chassis member 23 and lifted to the Z2 side.

Thus, a user can quickly recognize that the first chassis member 22 has come off due to the expansion of the battery 28. Therefore, a maintenance worker can completely remove the first chassis member 22 from the second chassis member 23 simply by removing the screws 42 of the fastening parts 32, and can easily replace the battery 28. As described above, in the electronic apparatus 10, if the battery 28 expands, the edge 22*d* and the surroundings of the first chassis member 22 smoothly come off from the second chassis member 23, thus making it possible to suppress plastic deformation of or damage to the first chassis member 22 due to being subjected to an excessive force from the expansion part 28*a*.

Figure 8:
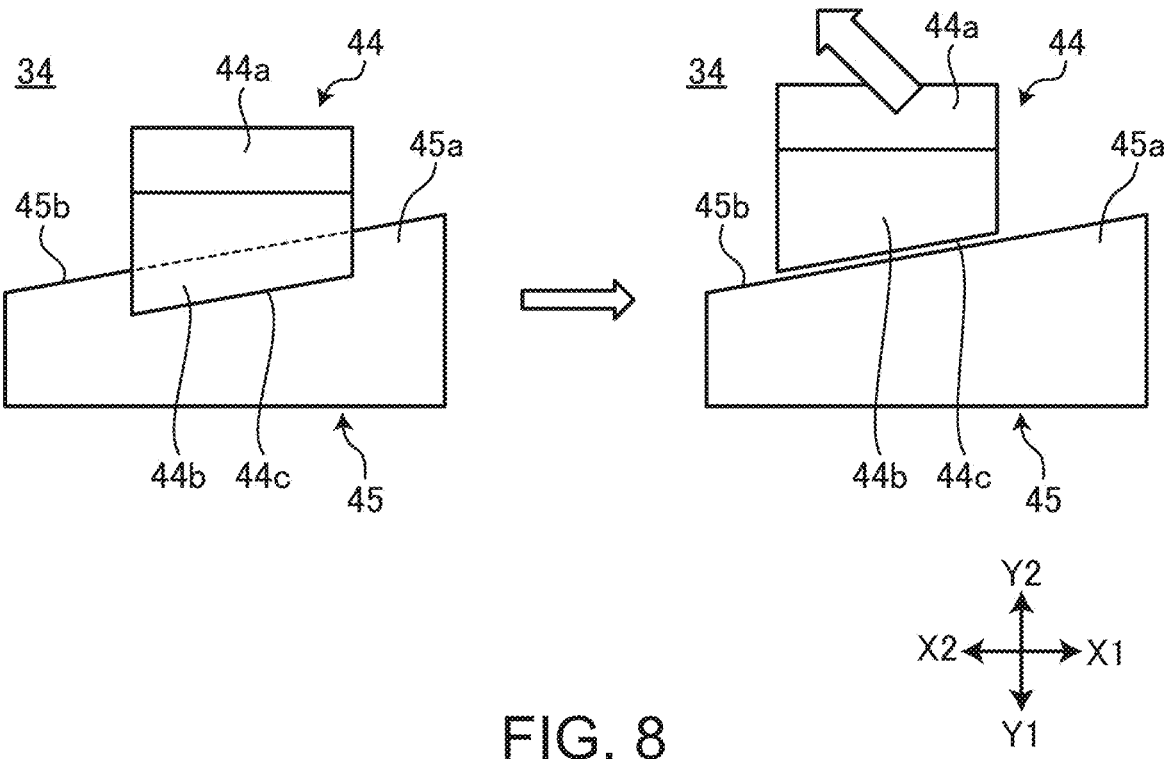
FIG. 8 presents explanatory diagrams illustrating a change in the state of engagement with a receiving part when the engagement piece of the first engagement part moves in a diagonal direction.
Figure 9:
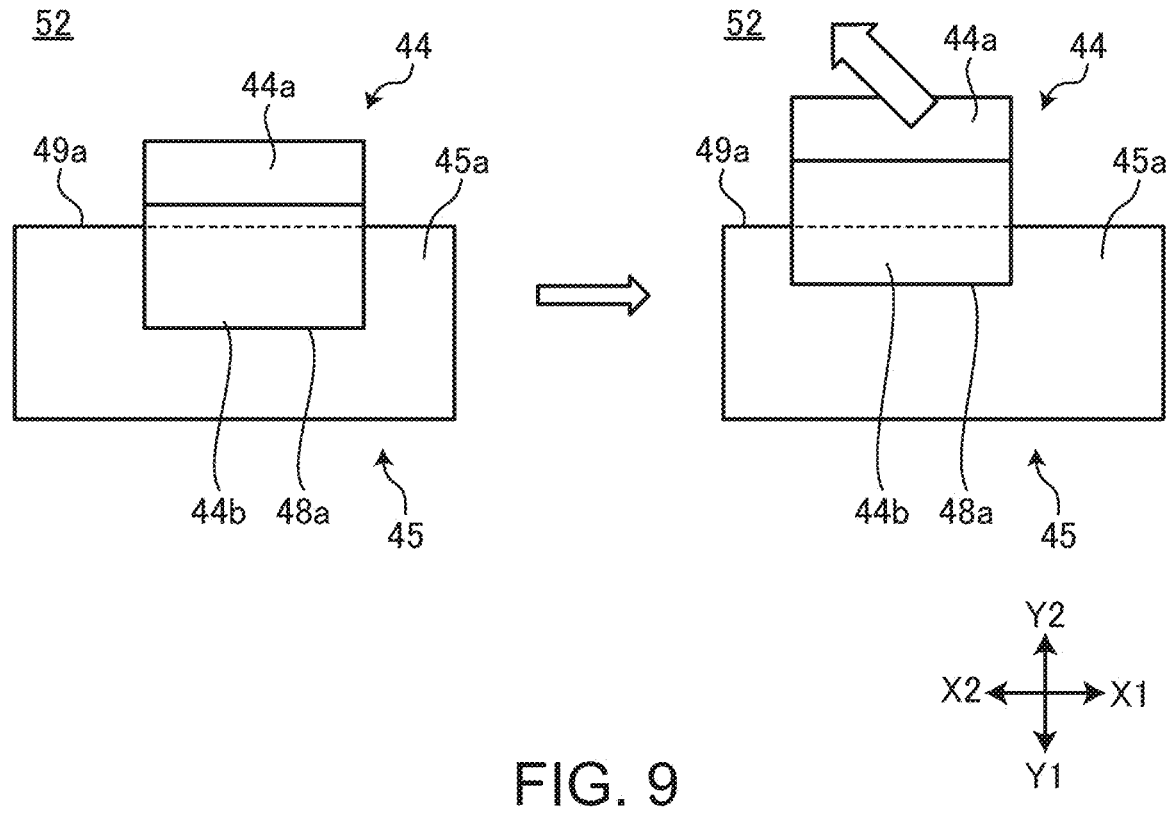
FIG. 9 presents explanatory diagrams illustrating a change in the state of engagement with a receiving part when an engagement piece of an engagement part according to a comparative example of the first engagement part illustrated in FIG. 8 moves in a diagonal direction.

Referring now to FIG. 8 and FIG. 9, the operation and the working effect of the first engagement part 34 having the slope surfaces 44*c* and 45*b* (example) will be described more specifically in comparison with a conventional engagement part 52 having a typical configuration (comparative example). The operation and the working effect of the second engagement part 35 are substantially the same as those of the first engagement part 34.

FIG. 8 presents explanatory diagrams illustrating a change in the state of engagement with the receiving part 45 when the engagement piece 44 of the first engagement part 34 moves in a diagonal direction (X2/Y2 direction). FIG. 9 presents explanatory diagrams illustrating a change in the state of engagement with the receiving part 45 when an engagement piece 44 of an engagement part 52 according to the comparative example of the first engagement part 34 illustrated in FIG. 8 moves in the diagonal direction (the X2/Y2 direction).

The engagement part 52 illustrated in FIG. 9 has a configuration in which the slope surfaces 44*c* and 45*b* of the first engagement part 34 of the example illustrated in FIG. 8 have been replaced by planes 48*a* and 49*a* similar to those of the third engagement part 36.

In the first engagement part 34 illustrated in FIG. 8, when the engagement piece 44 moves in the diagonal direction (the X2/Y2 direction) as the battery 28 expands, the engagement between the hook portion 44*b* and the receiving surface 45*a* is easily released. This is because the amount of engagement (the locking distance) between the hook portion 44*b* and the receiving surface 45*a* in a direction along the direction of the relative movement (the X2/Y2 direction) of the engagement piece 44 and the receiving part 45 is small due to the presence of the slope surfaces 44*c* and 45*b*. Consequently, in the first engagement part 34, although the movement distance of the engagement piece 44 in the Y2 direction is smaller than the third engagement part 36 located in the vicinity of the center of the edge 22*d*, the hook portion 44*b* easily disengages from the receiving surface 45*a* at a shortest distance in design. In the second engagement part 35 also, the engagement piece 46 smoothly detaches from the receiving part 47 due to the same effect when the battery 28 expands (refer also to FIG. 7).

On the other hand, in the engagement part 52 of the comparative example illustrated in FIG. 9, even if the engagement piece 44 moves in the diagonal direction by the same distance as the case illustrated in FIG. 8, the hook portion 44*b* cannot easily detach from the receiving surface 45*a*. This is because the hook portion 44*b* and the receiving surface 45*a* having the planes 48*a* and 49*a* have a larger amount of engagement (a longer locking distance) in the direction along the relative movement direction (the X2/Y2 direction) of the engagement piece 44 and the receiving part 45. Consequently, in the engagement part 52, the hook portion 44*b* of the engagement piece 44 that has a smaller movement distance in the Y2 direction than that of the third engagement part 36 located in the vicinity of the center of the edge 22*d* cannot easily detach from the receiving surface 45*a*. Thus, as compared with the engagement part 52 of the comparative example illustrated in FIG. 9, the first engagement part 34 of the example illustrated in FIG. 8 can detach from the receiving part 45 more smoothly when the battery 28 expands, causing the engagement piece 44 to be pulled in the diagonal direction.

As described above, in the electronic apparatus 10 of one or more embodiments, the battery 28 is placed at the position closer to the edge 22*d* than to the edge 22*c* in the chassis 12. The end surfaces of the engagement piece 44 provided on the end portion 22*d*1 at the one end of the edge (the second edge) 22*d* of the first chassis member 22, and the receiving part 45, which engages with and disengages from the engagement piece 44, are provided with the slope surfaces (the first slope surfaces) 44*c* and 45*b*, which gradually incline from the edge 22*c* side to the edge 22*d* side toward the end portion 22*d*2 at the other end. Similarly, the end surfaces of the engagement piece 46 provided at the end portion 22*d*2 at the other end of the edge 22*d* of the first chassis member 22, and the receiving part 47, which engages with and disengages from the engagement piece 46, are provided with the slope surfaces (the second slope surfaces) 44*c* and 45*b*, which gradually incline from the edge 22*d* side to the edge 22*c* side to the end portion 22*d*2 side from the end portion 22*d*1 side.

Therefore, according to the electronic apparatus 10, even if the battery 28 expands due to a failure, pressing the first chassis member 22, the engagement between the engagement pieces 44 and 46 and the receiving parts 45 and 47, which connect the edge 22*d* positioned in the vicinity of the battery 28 to the second chassis member 23, will be smoothly released. In other words, as soon as the battery 28 expands to a predetermined expansion level or more, the connection between the chassis members 22 and 23 will be released, and the chassis 12 will open at the edge 22*d*. As a result, it is possible to suppress the occurrence of damage, such as cracks, to the first chassis member 22 due to being subjected to an excessive force from the battery 28, which has expanded, so that maintenance cost and labor can be suppressed. The edge 22*c* is fixed by the screws 42 of the fastening parts 32. Thus, the fastening parts 32 continue to support the first chassis member 22 after the chassis 12 opens at the edge 22*d* as described above, making it possible to prevent accidental falling or the like of the first chassis member 22 with resultant improved handleability.

In one or more embodiments, the engagement piece 44 is placed at the position beyond the end portion (side surface) of the battery 28 on the X1 side with respect to the longitudinal direction of the edge 22*d*, and is positioned not overlapping with the battery 28 in the Y direction (refer to FIG. 2 and FIG. 7). Similarly, the engagement piece 46 is placed at the position beyond the end portion (side surface) of the battery 28 on the X2 side with respect to the longitudinal direction of the edge 22*d*, and is positioned not overlapping with the battery 28 in the Y direction. Consequently, when drawn by the first chassis member 22 lifted when the battery 28 expands, the engagement pieces 44 and 46 tend to have a larger movement amount in the X direction than a movement amount in the Y2 direction. Therefore, in the case of, for example, the engagement part 52 illustrated in FIG. 9, if the movement amount thereof in the X direction is larger as described above, then release of the engagement becomes further difficult. In this respect, the slope surfaces 44*c* and 45*b* provided in the engagement parts 34 and 35 of one or more embodiments ensure smooth release of the engagement even when such a movement amount in the X direction is larger.

The hook portion 44*b* and the receiving surface 45*a* of each of the engagement parts 34 and 35 have the slope surfaces 44*c* and 45*b*, so that the engagement with each other is easily released when moving in the diagonal direction described above, whereas there is a sufficient amount of engagement (locking distance) in the Y direction when the chassis members 22 and 23 are in a normal connected state. Therefore, the engagement parts 34 and 35 are suppressed from accidental disengagement when, for example, the chassis 12 is subjected to an impact from falling or the like.

On the other hand, the third engagement parts 36 located between the end portions 22*d*1 and 22*d*2 of the edge 22*d* are placed at the positions not beyond the end portions (the side surfaces) of the battery 28 on the X1 and X2 sides with respect to the longitudinal direction of the edge 22*d*, and are positioned overlapping the battery 28 in the Y direction (refer to FIG. 2 and FIG. 7). Therefore, when drawn by the first chassis member 22 lifted when the battery 28 expands, the engagement pieces 48 of the third engagement parts 36 hardly move in the X direction, but move exclusively in the Y2 direction. Hence, the third engagement parts 36 are configured to have the planes 48*a* and 49*a* along an XZ direction in place of the slope surfaces 44*c* and 45*b* so as to ensure smooth disengagement when the battery 28 expands. The third engagement parts 36 of course also have sufficient engagement amounts (locking distances) in the Y direction, thus suppressing accidental disengagement when the chassis 12 is subjected to an impact from falling or the like.

The present invention is not limited to the embodiments described above, and obviously, changes can be freely added within a scope not departing from the gist of the present invention.

DESCRIPTION OF SYMBOLS

10 electronic apparatus
12 chassis

22 first chassis member
23 second chassis member
28 battery
32 fastening part
34 first engagement part
35 second engagement part
36 third engagement part
38 attraction part
38*a* first attraction piece
38*b* second attraction piece
40 auxiliary engagement part
44, 46, 48 engagement piece
44*c*, 45*b* slope surface
45, 47, 49, 51 receiving part
48*a*, 49*a* plane

What is claimed is:

1. An electronic apparatus comprising:
a chassis having a first chassis member which has a first edge and a second edge that are substantially parallel to each other and which is formed in a substantially rectangular plate shape, and a second chassis member to which the first chassis member is detachably connected;
a battery housed in the chassis;
a plurality of screws which are provided along the first edge of the first chassis member and which fasten the first edge to the second chassis member;
a first engagement piece which is provided on one end portion in a longitudinal direction of the second edge of the first chassis member and which protrudes facing outward relative to the second edge;
a second engagement piece which is provided on the other end portion in the longitudinal direction of the second edge of the first chassis member and which protrudes facing outward relative to the second edge; and
a first receiving part which is provided on the second chassis member and with/from which the first engagement piece engages/disengages, and a second receiving part which is provided on the second chassis member and with/from which the second engagement piece engages/disengages,
wherein the battery is placed at a position closer to the second edge than to the first edge in the chassis,
an end surface of the first engagement piece and an end surface of the first receiving part each has a first slope surface that gradually inclines from the first edge side to the second edge side in a first direction extending from the one end portion to the other end portion, and
an end surface of the second engagement piece and an end surface of the second receiving part each has a second slope surface that gradually inclines from the second edge side to the first edge side in the first direction.

2. The electronic apparatus according to claim 1,
wherein the first slope surface and the second slope surface have a symmetrical shape with respect to a plane orthogonal to a longitudinal direction of the second edge.

3. The electronic apparatus according to claim 1,
wherein the first engagement piece and the second engagement piece are placed at positions beyond an end of the battery with respect to the longitudinal direction of the second edge, thereby not overlapping with the battery in a direction orthogonal to the longitudinal direction.

4. The electronic apparatus according to claim 3, further including:

a third engagement piece which is provided at a position between the one end portion and the other end portion in the longitudinal direction of the second edge of the first chassis member and which protrudes facing outward relative to the second edge; and a third receiving part which is provided on the second chassis member and with/from which the third engagement piece engages/disengages, wherein the third engagement piece is placed at a position not beyond an end of the battery with respect to the longitudinal direction of the second edge, thereby overlapping the battery in a direction orthogonal to the longitudinal direction, and an end surface of the third engagement piece and an end surface of the third receiving part are planes along the longitudinal direction of the second edge.

5. The electronic apparatus according to claim 1, the first chassis member further having a third edge and a fourth edge, which are substantially orthogonal to the first edge and the second edge and are substantially parallel to each other, further including:

a first attraction piece provided at a middle in a longitudinal direction of each of the third edge and the fourth edge of the first chassis member; and a second attraction piece which is provided on the second chassis member and which can be attracted to the first attraction piece, wherein one of the first attraction piece and the second attraction piece is a magnet and the other is a magnet or a magnetic material.

\* \* \* \* \*